United States Patent
Badke et al.

(10) Patent No.: US 8,897,407 B2
(45) Date of Patent: Nov. 25, 2014

(54) RF (INCLUDING GNSS) SIGNAL INTERFERENCE MITIGATION SYSTEM AND METHOD

(71) Applicant: Hemisphere GNSS Inc., Scottsdale, AZ (US)

(72) Inventors: Bradley P. Badke, Chandler, AZ (US); Michael L. Whitehead, Scottsdale, AZ (US); Walter J. Feller, Airdrie (CA); Gregory J. Durnan, Tempe, AZ (US)

(73) Assignee: Hemisphere GNSS Inc., Scottsdale, AZ (US)

( * ) Notice: Subject to any disclaimer, the term of this patent is extended or adjusted under 35 U.S.C. 154(b) by 0 days.

(21) Appl. No.: 13/705,018

(22) Filed: Dec. 4, 2012

(65) Prior Publication Data

US 2013/0142295 A1 Jun. 6, 2013

Related U.S. Application Data

(60) Provisional application No. 61/566,669, filed on Dec. 4, 2011.

(51) Int. Cl.
*H04B 1/10* (2006.01)
*H04B 15/00* (2006.01)

(52) U.S. Cl.
CPC ............... *H04B 15/00* (2013.01); *H04B 1/109* (2013.01)
USPC ....... 375/350; 342/357.59; 375/148; 375/346

(58) Field of Classification Search
None
See application file for complete search history.

(56) References Cited

U.S. PATENT DOCUMENTS

| | | | |
|---|---|---|---|
| 6,477,196 B1 * | 11/2002 | Swanke et al. ................ | 375/147 |
| 6,505,117 B1 | 1/2003 | Ratert et al. | |
| 6,516,271 B2 | 2/2003 | Upadhyaya et al. | |
| 6,539,303 B2 | 3/2003 | McClure et al. | |
| 7,268,727 B2 | 9/2007 | Montgomery et al. | |
| 7,292,186 B2 | 11/2007 | Miller et al. | |
| 7,315,278 B1 | 1/2008 | Bauregger et al. | |
| 8,184,050 B2 | 5/2012 | Le Sage et al. | |
| 8,190,337 B2 | 5/2012 | McClure et al. | |
| 8,232,916 B2 | 7/2012 | Kirk | |
| 2004/0097241 A1 * | 5/2004 | Duffet-Smith et al. .... | 455/456.1 |
| 2012/0050104 A1 | 3/2012 | Jakab et al. | |
| 2012/0186073 A1 | 7/2012 | Feller et al. | |
| 2012/0188143 A1 | 7/2012 | Yang et al. | |
| 2012/0258771 A1 | 10/2012 | Lei et al. | |
| 2012/0326932 A1 | 12/2012 | Hsu et al. | |

(Continued)

OTHER PUBLICATIONS

"International Search Report and Written Opinion", PCT/US2009/063594, (Jan. 11, 2010).

(Continued)

*Primary Examiner* — Adolf Dsouza
(74) *Attorney, Agent, or Firm* — Schmeiser, Olsen & Watts LLP; Lowell W. Gresham; Karen E. Jachimowicz

(57) ABSTRACT

An RF (e.g., GNSS) interference mitigation system and method uses a switchable bank of filters for selectively blocking signals in predetermined bandwidths based on detecting strong, interfering signals with an interference detection circuit including a sniffer antenna. A low-strength RF (e.g., GNSS) system can be combined with a spectrally-close high-strength, telecommunications receiver system for cooperative control. Alternatively, an RF receiver can detect tones, changes in DC bias or level changes to activate a filter selection switch.

4 Claims, 4 Drawing Sheets

(56) References Cited

U.S. PATENT DOCUMENTS

| | | |
|---|---|---|
| 2013/0009832 A1 | 1/2013 | Apostolos et al. |
| 2013/0009840 A1 | 1/2013 | Liu et al. |
| 2013/0076567 A1 | 3/2013 | Chaudhary et al. |
| 2013/0082879 A1 | 4/2013 | Fuchs et al. |
| 2013/0106640 A1 | 5/2013 | Wang et al. |
| 2013/0109309 A1 | 5/2013 | Desclos et al. |
| 2013/0113571 A1 | 5/2013 | Ashjaee et al. |
| 2013/0162477 A1 | 6/2013 | Waters et al. |

OTHER PUBLICATIONS

"International Preliminary Report on Patentability and Written Opinion", PCT/US2009/063594, (May 10, 2011).

* cited by examiner

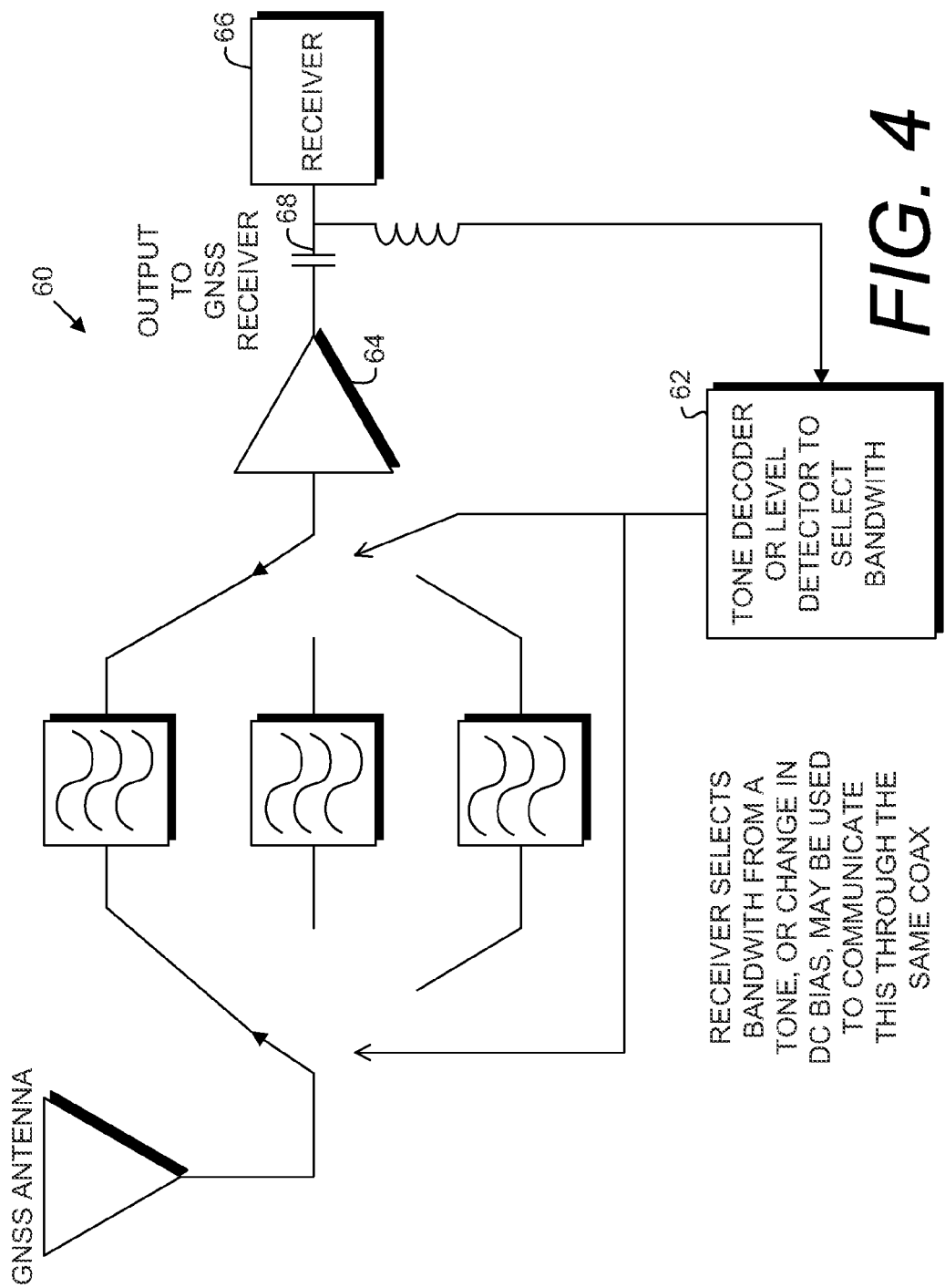

RF (INCLUDING GNSS) SIGNAL INTERFERENCE MITIGATION SYSTEM AND METHOD

CROSS-REFERENCE TO RELATED APPLICATION

This application claims priority in U.S. Provisional Patent Application No. 61/566,669, filed Dec. 4, 2011, which is incorporated herein by reference.

BACKGROUND OF THE INVENTION

1. Field of the Invention

The present invention relates generally to mitigating radio frequency (RF) signal interference in RF/digital receivers, and in particular to a selective filtering system and method for a global navigation satellite system (GNSS) susceptible to interference from signals in spectrally-adjacent bandwidths.

2. RF (Including GNSS) Background and Description of the Related Art

Global navigation satellite systems (GNSSs) include the Global Positioning System (GPS), which was established and is operated by the United States government and employs a constellation of 24 or more satellites in well-defined orbits at an altitude of approximately 20,200 km. These satellites continuously transmit microwave L-band radio signals in three frequency bands, centered at 1575.42 MHz, 1227.60 MHz and 1176.45 MHz, denoted as L1, L2 and L5 respectively. All GNSS signals include timing patterns relative to the satellite's onboard precision clock (which is kept synchronized by a ground station) as well as a navigation message giving the precise orbital positions of the satellites.

GNSS receivers are highly sensitive devices designed to receive very weak signals transmitted by the source satellites. GNSS receivers process the radio signals, computing ranges to the GNSS satellites, and by triangulating these ranges, the GNSS receiver determines its position and its internal clock error. Different levels of accuracies can be achieved depending on the observables used and the correction techniques employed. For example, accuracy within about 2 cm can be achieved using real-time kinematic (RTK) methods with single or dual-frequency (L1 and L2) receivers.

GNSS also includes Galileo (Europe), the GLObal NAvigation Satellite System (GLONASS, Russia), Beidou (China), Compass (proposed), the Indian Regional Navigational Satellite System (IRNSS) and QZSS (Japan, proposed). Galileo will transmit signals centered at 1575.42 MHz, denoted L1 or E1, 1176.45 denoted E5a, 1207.14 MHz, denoted E5b, 1191.795 MHz, denoted E5 and 1278.75 MHz, denoted E6. GLONASS transmits groups of FDM signals centered approximately at 1602 MHz and 1246 MHz, denoted GL1 and GL2 respectively. QZSS will transmit signals centered at L1, L2, L5 and E6. Groups of GNSS signals are herein grouped into "superbands."

The United States' Global Positioning System (GPS) first reached fully operational capability on Jul. 17, 1995. After almost two decades, advances in technology and new demands have prompted efforts to modernize the GPS system. Part of the modernization are new civilian navigation signals to be transmitted on a frequency other than the L1 frequency (1575.42 MHz). This signal became known as the L2C signal because it is a civilian signal broadcast on the L2 frequency (1227.6 MHz). It is transmitted by all block IIR-M and newer generation satellites.

Whitehead et al. U.S. Pat. No. 6,744,404 shows an Unbiased Code Phase Estimator for Mitigating Multipath in GPS, and is incorporated herein by reference. U.S. Coast Guard Navigation Center, "GPS FAQ," U.S. Department of Homeland Security; and Navstar Global Positioning System, "Interface Specification-ICD-GPS-200," Navstar GPS Joint Program Office, are also incorporated herein by reference. Liu and Badke U.S. Provisional Patent Application Ser. No. 61/702,031 for GNSS System and Method Using Unbiased Code Phase Tracking with Interleaved Pseudo-Random Code is also incorporated herein by reference.

Dual-frequency GNSS receivers are preferably adaptable for use with all present and projected GNSS, transmitting signals which can be grouped into two "superbands" of radio signal frequencies generally in the range of about 1160 MHz to 1250 MHz and 1525 MHz to 1613 MHz.

RF signal frequency spectra allocations are highly regulated by the Federal Communications Commission (FCC) in the United States and by other agencies worldwide. As the airwaves become more crowded as a consequence of demand for RF signal spectra allocations, reception problems arise from signal interference.

For example, the telecommunications industry has experienced significant growth and increasing wireless traffic levels. Wireless telecommunications via RF signals are becoming increasingly popular among telecommunications service subscribers. To accommodate such demand, telecommunications service providers, through their industry associations, commonly seek FCC allocations of more frequency spectra.

The interests of the telecommunications industry are sometimes adverse to the other RF service providers. For example, GNSS service providers, including the U.S. Department of Defense with its Global Positioning System (GPS), are increasingly likely to encounter interference problems associated with nearby or spectrally-adjacent telecommunications bandwidth usage.

The present invention addresses the RF-digital signal interference problems with previous RF receivers. Heretofore, there has not been available an interference mitigating RF system and method with the advantages and features of the present invention.

SUMMARY OF THE INVENTION

In the practice of the present invention an interference mitigating system and method are provided for detecting interfering signals and automatically switching among a bank of filters, or by selective filtering based on signals' bandwidths not being used by a receiver.

BRIEF DESCRIPTION OF THE DRAWINGS

The accompanying drawings illustrate the principles of the present invention and an exemplary embodiment thereof.

FIG. 4 shows an interference avoidance LNA comprising an alternative embodiment or aspect of the present invention including a tone decoder or level detector for bandwidth selection in the switchable filter.

DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning. The invention can be fabricated in various sizes and configurations from a wide variety of suitable materials and components, which are chosen for their characteristics according to the intended use and the operation of the invention.

II. Interference Avoidance System and Method

Figure 1:
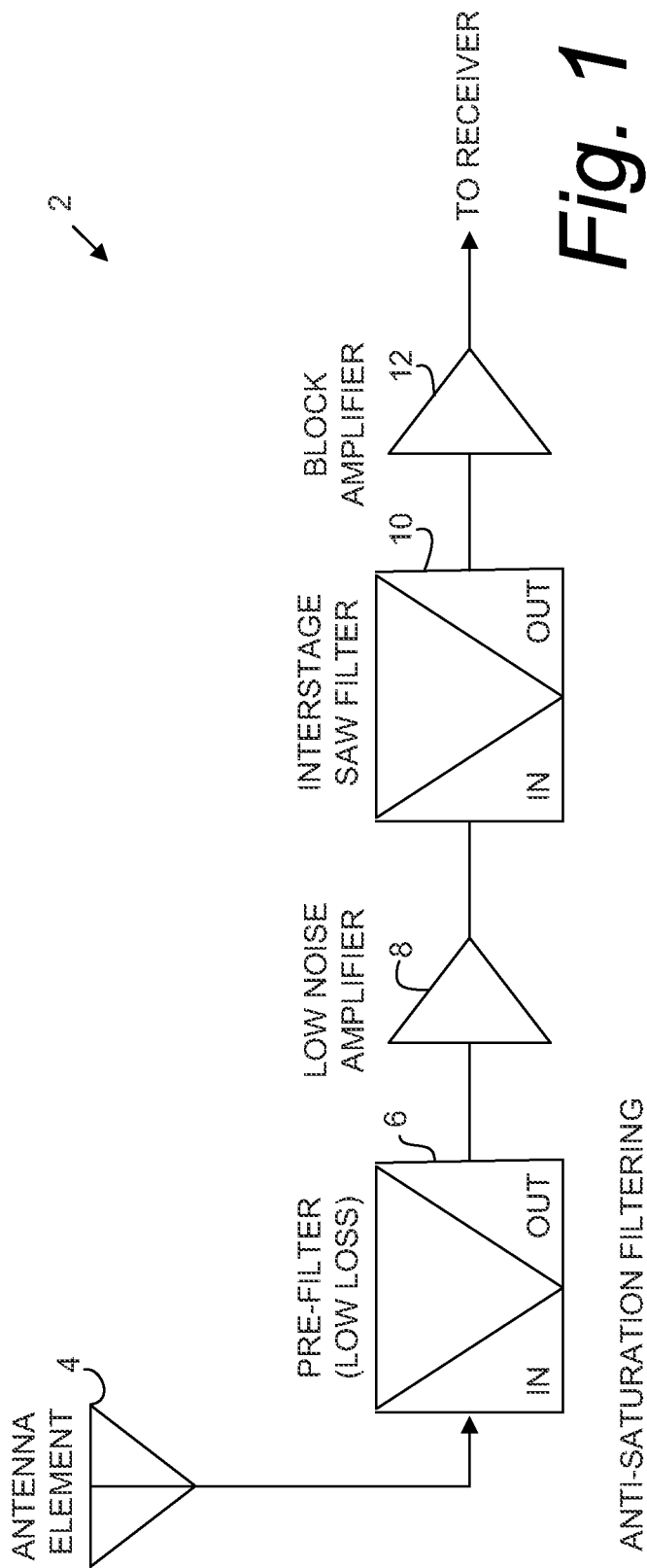
FIG. 1 is a diagram of an RF antenna and receiver system adapted for maximizing LNA gain while not saturating on spectrally-nearby, high-strength communications signals, which system is adapted for utilizing an embodiment of the present invention, e.g., in the LNA.

FIG. 1 shows an RF antenna and anti-saturation filtering system 2 embodying an aspect of the present invention including an antenna element 4 connected to a low loss prefilter 6, which is connected to an LNA 8. The LNA 8 is connected to an interstage SAW filter 10, which in turn connects to a block amplifier 12 with an output to a receiver. This configuration provides a solution to the problem of designing a GNSS receiver that is highly sensitive to receive the relatively weak GNSS satellite signals and not be de-sensitized by communication signals that are spectrally close to the GNSS signals. The resulting high-precision GNSS receiver configuration can thus be compatible with high-strength communication system signals in the nearby frequency spectrum.

It is highly important to maximize the gain of the LNA 8 and minimize its noise figure. These factors determine the sensitivity of the entire GNSS antenna and receiver system based on the cascaded amplification function, which can be represented by the Friis equation:

$$F_{total} = F_1 + \frac{F_2 - 1}{G_1} + \frac{F_3 - 1}{G_1 G_2} + \frac{F_4 - 1}{G_1 G_2 G_3} + \ldots$$

By carefully designing the LNA 8 to maximize its gain, maximize it saturation level, and minimize its noise figure so that the GNSS receiver has maximum sensitivity, the interstage filter 10 can be aggressively designed to eliminate interference from spectrally nearby high-strength signals. The spectral proximity of the high-strength (e.g., telecommunications) signals to the GNSS signals of interest tends to compromise the effectiveness of analog filtering techniques. Additional digital filtering is thus required, along with increased sample rates to avoid aliasing of the interfering signals and increase the number of bits in the analog-to-digital converter (ADC) to improve the dynamic range of the GNSS receiver so that the required digital filtering can be effectively implemented.

Moreover, in addition to mitigating their impact on the GNSS positioning functions, an objective of the system design is to utilize these spectrally-close, high-strength communication signals by: 1) receiving differential correctors; 2) remote programming; 3) remote configuration; and 4) remote data collections.

Figure 2:
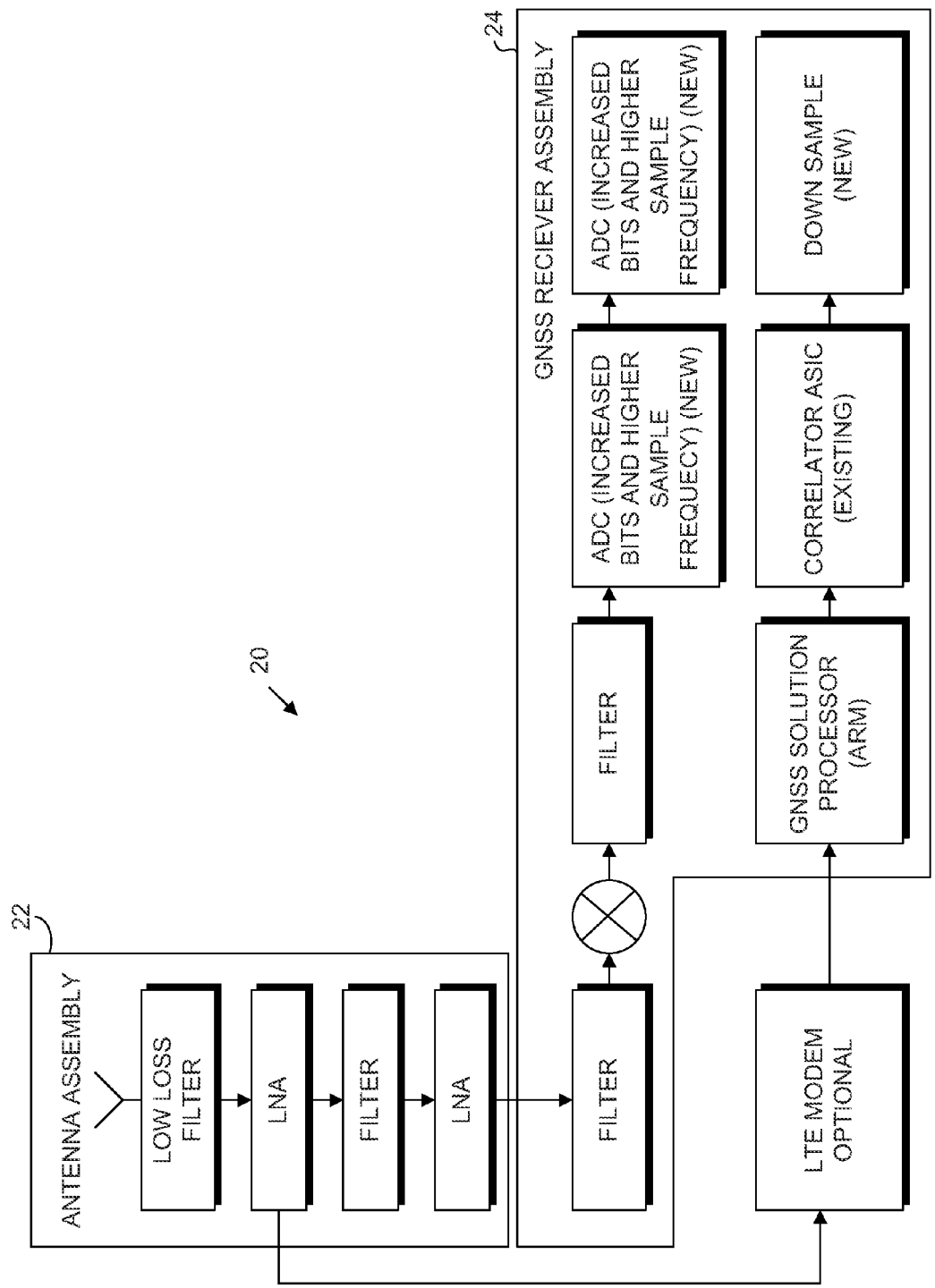
FIG. 2 is a diagram of a combined GNSS and communication system receiver, which is adapted for use with an interference avoidance LNA switchable filter system embodying an aspect of the present invention.

FIG. 2 shows a combined GNSS and communication system receiver 20 including an antenna assembly 22 connected to a GNSS receiver assembly 24. An optional LTE modem can be provided for connecting an LNA in the antenna assembly 22 with a GNSS solution processor (ARM) in the receiver assembly 24.

Figure 3:
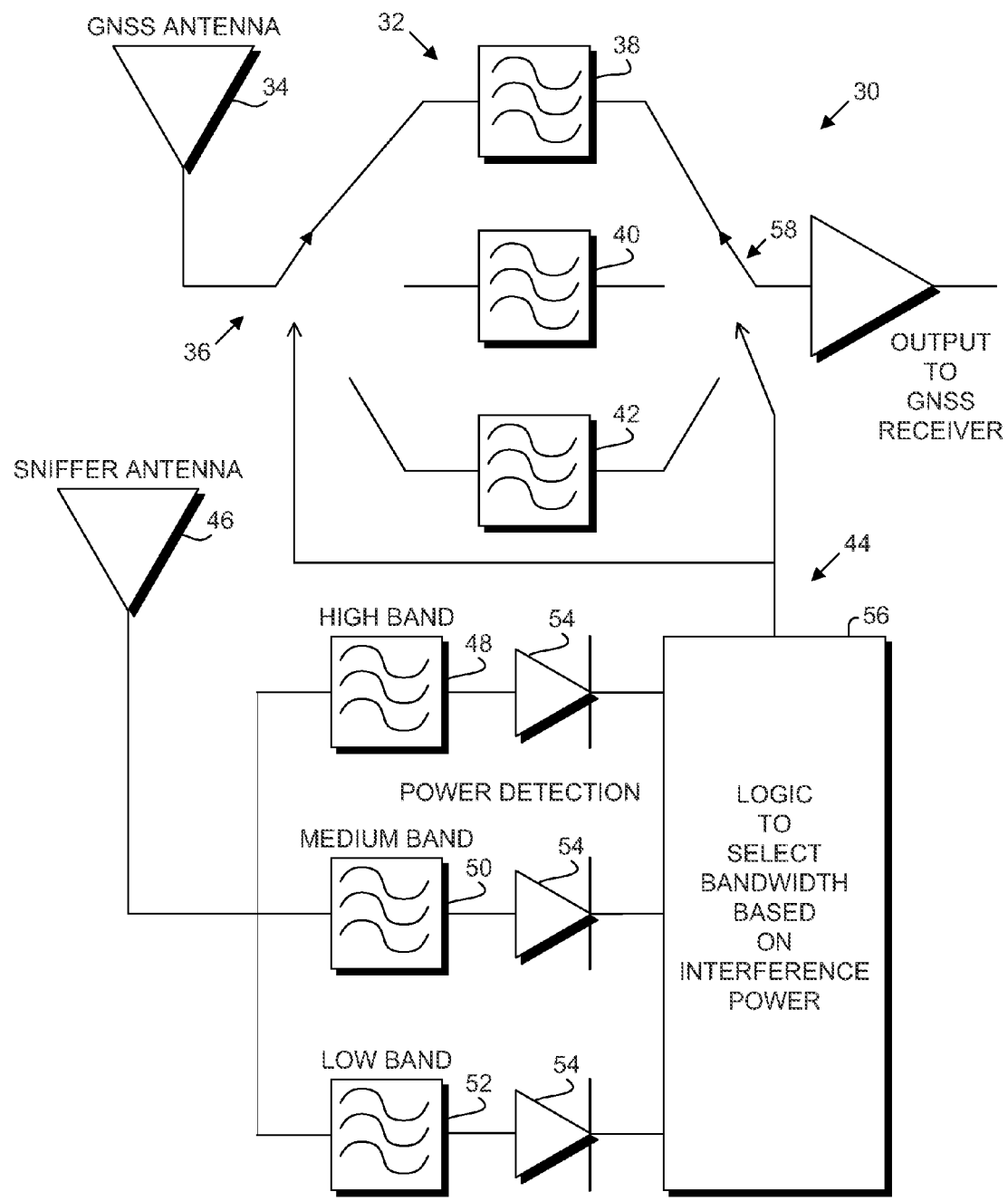
FIG. 3 is a diagram of an interference avoidance circuit within the LNA.

FIG. 3 shows an interference avoidance LNA 30 embodying an aspect of the present invention and including a switchable bank of filters 32. GNSS signals and correctional services currently occupy to wide bandwidths of 1167-1253 MHz and 1525-1610 MHz. Most high-end GNSS LNAs cover these entire bandwidths for use with multiple receiver architectures. A disadvantage is that the LNA can be susceptible to saturation from any strong signal in these bands, even if those bands are not being used. The present invention provides a switchable bank of filters for selecting respective bandwidths based on either: 1) interfering signal detection; or 2) selection from the receiver when some signals' bandwidths are not required.

An RF (e.g., GNSS) antenna 34 is connected to the filter bank 32 by a filter-selection switch 36, which selectively inputs signals received by the antenna 34 to first, second and third bandwidth filters 38, 40, 42 respectively. The bandwidth filters can be chosen based on any desired performance characteristics, e.g., high, medium and low frequency bands. The switching function among the bandwidth filters 38, 40, 42 is performed automatically by the interference detection circuit 44, which includes a sniffer antenna 46 adapted to detect interference in conjunction with filters 48, 50, 52, communicating through respective diodes 54 to a logic circuit 56 adapted to select a respective bandwidth based on the interference power of the detected interfering signal. An output selection switch 58 can ask a respective bandwidth filter 38, 40 or 42 to a GNSS receiver, e.g., via a block amplifier 12.

If interference is detected in one of these bands by the detection circuit 44, the filter bank 32 will be switched accordingly and the receiver will not operate in the interfering bandwidth, although other signals will still be usable. In a normal LNA the presence of a strong jamming interference signal would block all of these signals by saturation of the LNA.

III. Alternative Embodiment Interference Avoidance LNA 60

An interference avoidance LNA 60 comprising an alternative aspect or embodiment of the present invention is shown in FIG. 4 and includes a receiver 66 coupled to (or including) a tone decoder or level detector 62 adapted for detecting a tone, a level change or a change in DC, which can be communicated through the same coaxial cable 68 to an LNA 64 with a change in DC bias voltage or a low-frequency tone, for example. A filter bank 72 includes first, second and third bandpass filters 74, 76, 78 respectively. A frequency selection switch 80 and an output selection switch 82 are connected to the filter bank 72 and are similar to the switches 36, 58 described above. The switches 80, 82 can be operated by a logic circuit similar to the logic circuit 56 described above.

It will be appreciated that the components of the system 2 can be used for various other applications. Moreover, the subsystems, units and components of the system 2 can be combined in various configurations within the scope of the present invention. For example, the various units could be combined or subdivided as appropriate for particular applications. The system 2 is scalable as necessary for applications of various complexities. It is to be understood that while certain aspects of the disclosed subject matter have been shown and described, the disclosed subject matter is not limited thereto and encompasses various other embodiments and aspects.

Having thus described the invention, what is claimed as new and desired to be secured by Letters Patent is:

1. An interference avoidance low noise amplifier (LNA) for a radio frequency (RF) antenna and receiver system, which LNA includes:
    multiple bandpass filters selectively connectable to an RF antenna element and to an output connected to an RF receiver, each filter corresponding to a respective RF bandwidth;
    a sniffer antenna adapted to detect RF interference signals in a respective RF band;
    a logic circuit connected to the sniffer antenna and adapted to select a respective bandwidth based on an interference signal detected by said sniffer antenna;
    an automatic switch activated by said logic circuit and adapted to connect said antenna element and said antenna output to a respective bandpass filter;
    a receiver selecting the bandwidth selected by the logic circuit for switching out based on a change in direct current (DC) bias;
    a solution processor for detecting an interfering signal and switching out a respective frequency bandwidth in response to said detected interfering signal;
    said solution processor includes a logic circuit adapted to select the switched-out bandwidth based on interference power;
    said logic circuit utilizes multiple bandpass filters for detecting an interfering signal and providing a corresponding signal to said logic circuit for activating a respective filter connected to said antenna element; and
    said solution processor including a signal processing function connected to an RF receiver and adapted for selecting a bandwidth in use and blocking a bandwidth not in use by the receiver.

2. The interference avoidance LNA according to claim 1, which includes:
    said RF receiver being configured for receiving global navigation satellite system (GNSS) positioning signals.

3. A method of avoiding interference with a low noise amplifier (LNA) for a radio frequency (RF) antenna and receiver system, which method includes:
    providing multiple bandpass filters selectively connectable to an RF antenna element and to an output connected to an RF receiver, each filter corresponding to a respective RF bandwidth;
    providing a sniffer antenna adapted to detect RF interference signals in a respective RF band;
    providing an automatic switch activated by said logic circuit and adapted to connect said antenna element and said antenna output to a respective bandpass filter;
    providing a solution processor with a logic circuit for detecting an interfering signal and switching out the bandwidth selected by the logic circuit;
    providing a receiver selecting the bandwidth selected by the logic circuit for switching out based on a change in direct current (DC) bias;
    said logic circuit utilizing multiple bandpass filters for detecting an interfering signal and providing a corresponding signal to said logic circuit for activating a respective filter connected to said antenna element; and
    said solution processor including a signal processing function connected to the RF receiver and adapted for selecting a bandwidth in use and blocking a bandwidth not in use by the receiver.

4. The interference avoidance method according to claim 3, which includes:
    said RF receiver receiving global navigation satellite system (GNSS) positioning signals.

\* \* \* \* \*